United States Patent
Jing et al.

(10) Patent No.: US 12,002,069 B2
(45) Date of Patent: Jun. 4, 2024

(54) INFORMATIONAL AND ADVERTISER LINKS FOR USE IN WEB MAPPING SERVICES

(71) Applicant: Google LLC, Mountain View, CA (US)

(72) Inventors: Yushi Jing, Mountain View, CA (US); Shumeet Baluja, Leesburg, VA (US)

(73) Assignee: GOOGLE LLC, Mountain View, CA (US)

( * ) Notice: Subject to any disclaimer, the term of this patent is extended or adjusted under 35 U.S.C. 154(b) by 420 days.

(21) Appl. No.: 16/183,175

(22) Filed: Nov. 7, 2018

(65) Prior Publication Data
US 2019/0114669 A1 Apr. 18, 2019

Related U.S. Application Data

(63) Continuation of application No. 14/836,287, filed on Aug. 26, 2015, now Pat. No. 10,152,728, which is a
(Continued)

(51) Int. Cl.
*G06Q 30/0251* (2023.01)
*G06Q 30/02* (2023.01)
(Continued)

(52) U.S. Cl.
CPC ......... *G06Q 30/0257* (2013.01); *G06Q 30/02* (2013.01); *G06Q 30/0201* (2013.01);
(Continued)

(58) Field of Classification Search
CPC .... G06Q 20/204; G06Q 20/20; G06Q 20/322; G06Q 20/3278; G06Q 20/202;
(Continued)

(56) References Cited

U.S. PATENT DOCUMENTS

| 7,599,938 B1 | 10/2009 | Harrison |
| 7,777,648 B2 | 8/2010 | Smith et al. |

(Continued)

FOREIGN PATENT DOCUMENTS

| JP | 11-296540 | 10/1999 |
| KR | 10-2000-0072571 | 12/2000 |

(Continued)

OTHER PUBLICATIONS

Becker, Leslie F. University of California, Berkeley. Design and Ethics: Rationalizing Consumption through the Graphic Image. ProQuest Dissertations Publishing, 2008. (Year: 2008).*

(Continued)

*Primary Examiner* — Florian M Zeender
*Assistant Examiner* — Fawaad Haider
(74) *Attorney, Agent, or Firm* — DORITY & MANNING P.A.

(57) ABSTRACT

Techniques for identifying groups of local features in an image and presenting advertisement information associated with stored images that match one or more features within the group of local features are described. The techniques include providing an image, identifying a region of interest in the image, providing a user-selectable link associated with the region of interest in the image, receiving a request for the region of interest in the image via the user-selectable link, and presenting advertisement information associated with a stored image that matches one or more features within the requested region of interest.

18 Claims, 6 Drawing Sheets

Related U.S. Application Data continuation of application No. 12/025,862, filed on Feb. 5, 2008, now abandoned.

(51) Int. Cl.
*G06Q 30/0201* (2023.01)
*G06Q 30/0241* (2023.01)
*G06Q 30/0273* (2023.01)
*G06Q 30/08* (2012.01)

(52) U.S. Cl.
CPC ..... *G06Q 30/0259* (2013.01); *G06Q 30/0261* (2013.01); *G06Q 30/0269* (2013.01); *G06Q 30/0275* (2013.01); *G06Q 30/0277* (2013.01); *G06Q 30/08* (2013.01)

(58) Field of Classification Search
CPC .............. G06Q 30/0257; G06Q 30/02; G06Q 30/0201; G06Q 30/0259; G06Q 30/0261; G06Q 30/0269; G06Q 30/0275; G06Q 30/0277; G06Q 30/08
USPC .......................................................... 705/17
See application file for complete search history.

(56) References Cited

U.S. PATENT DOCUMENTS

| | | | |
|---|---|---|---|
| 2005/0021387 A1 | 1/2005 | Gottfurcht | |
| 2005/0273458 A1 | 12/2005 | Adams | |
| 2006/0241859 A1* | 10/2006 | Kimchi | G06Q 30/0277 705/14.51 |
| 2007/0027765 A1 | 2/2007 | Collins | |
| 2007/0130129 A1* | 6/2007 | Wagle | G06F 16/951 |
| 2007/0210937 A1* | 9/2007 | Smith | G06Q 30/02 340/995.1 |
| 2007/0264987 A1* | 11/2007 | Gupta | G06Q 30/0267 455/414.3 |
| 2008/0086356 A1 | 4/2008 | Glassman et al. | |
| 2008/0126206 A1 | 5/2008 | Jarrell | |
| 2008/0143727 A1 | 6/2008 | Oh | |
| 2008/0215415 A1 | 9/2008 | Willms | |
| 2009/0083815 A1* | 3/2009 | McMaster | H04N 21/8586 725/110 |
| 2010/0004995 A1* | 1/2010 | Hickman | G06Q 30/0261 705/14.58 |
| 2010/0034466 A1 | 2/2010 | Jing et al. | |
| 2010/0118025 A1* | 5/2010 | Smith | G06Q 30/02 345/418 |

FOREIGN PATENT DOCUMENTS

| | | |
|---|---|---|
| KR | 10-2001-0105634 | 11/2001 |
| KR | 10-2003-0069950 | 8/2003 |
| KR | 10-2005-0094557 | 9/2005 |
| KR | 10-2005-0116963 | 12/2005 |

OTHER PUBLICATIONS

Gilbert, Jeffrey Michael. Text /graphics and image transmission over bandlimited lossy links. University of California, Berkeley. ProQuest Dissertations Publishing, 2000. (Year: 2000).*

Young, Ha; Kwon, Wi-Suk; Lennon, Sharron J. Online visual merchandising (VMD) of apparel web sites. Journal of Fashion Marketing and Management; Bradford vol. 11, Iss. 4, (2007): 477-493. (Year: 2007).*

Authorized officer Dorothée Mülhausen, International Preliminary Report on Patentability in PCT/US2009/049700, dated Jan. 20, 2011, 7 pages.

Authorized officer Gijsbertus Beijer, International Preliminary Report on Patentability in PCT/US2009/053353, dated Feb. 24, 2011, 9 pages.

Ball, John. Architectural Street Credibility: Reframing Contemporary Architecture to Sidewalk Level with Images from Google Street View. Arizona State University, ProQuest Dissertations Publishing, 2014.

International Search Report and Written Opinion for PCT Application No. PCT/US2009/049700 dated Jan. 29, 2010, 12 pages.

International Search Report and Written Opinion for PCT Application No. PCT/US2009/053353 dated Feb. 24, 2010, 14 pages.

Schmid, C., et al., "Evaluation of Interest Point Detectors," International Journal of Computer Vision, 37(2): 151-172, 2000.

* cited by examiner

INFORMATIONAL AND ADVERTISER LINKS FOR USE IN WEB MAPPING SERVICES

CROSS REFERENCE TO RELATED APPLICATION

This application is a continuation of U.S. application Ser. No. 14/836,287, filed Aug. 26, 2015, which is a continuation of U.S. application Ser. No. 12/025,862, filed Feb. 5, 2008, the contents of each are hereby incorporated by reference.

TECHNICAL FIELD

This disclosure is generally related to online advertising.

BACKGROUND

Interactive media (e.g., the Internet) may help improve the targeting of advertisements ("ads") to receptive audiences. Ads can be presented as banner ads, sets of one or more text boxes, video ads, audio ads, and the like. For example, some websites provide information search functionality that is based on key words entered by the user seeking information. This user query can be an indicator of the type of information of interest to the user. By comparing the user query to a list of key words specified by an advertiser, it is possible to provide targeted ads to the user.

Another form of online advertising is ad syndication, which allows advertisers to extend their marketing reach by distributing contextual ads to additional partners. For example, third party online publishers can place an advertiser's text or image ads within or alongside desired publisher content to motivate potential customers to seek additional information (e.g., navigate to the advertiser's website, etc.). An example of such a system is AdSense™ offered by Google Inc.

In contextual advertising systems (e.g., AdSense™), ads are selected and served by automated systems based on the content displayed to the user in, for example, a browser window. The displayed content is analyzed to determine the "context" of the information (e.g., the main topic) so that ads that best match the context can be targeted to the content display. In contextual advertising systems such as AdSense, once the context of a content display is matched to a set of potential advertisements for display, an auction mechanism is used to select one or more potential advertisements to actually appear on the page.

Using interactive web mapping services, users can navigate a map based upon an input location. For example, a map of a street address could be modified in granularity (e.g., zoom in and out) or navigated directionally (e.g., pan to the north, east, south, west, etc.). Some web mapping services also provide the service of requesting driving directions between locations. An example web mapping service is Google Maps™ offered by Google Inc.

An additional capability provided by some web mapping services can include a panoramic view of the street location. For example, a user could view and/or navigate street-level images within an interactive web mapping service. The street-level images, for example, can be captured by a camera attached to a vehicle. The street level images can be navigated in a manner similar to the web mapping services, with granularity and directional navigation options. An example of a street-level image mapping service is Google Street View™ offered by Google Inc.

SUMMARY

According to one general aspect, a method includes providing an image, identifying a region of interest in the image, providing a user-selectable link associated with the region of interest in the image, receiving a request for the region of interest in the image via the user-selectable link, and presenting advertisement information associated with a stored image that matches features within the requested region of interest.

Implementations may include one or more of the following features. For example, identifying the region of interest in the image comprises analyzing one or more stored images to locate a stored image that includes features within the region of interest. The one or more stored images comprises images received from a user. Identifying the region of interest in the image comprises analyzing a set of global positioning coordinates associated with the region of interest. The advertisement information has an associated maximum bid, and presenting the advertisement information associated with a stored image that matches features within the requested region of interest comprises presenting the advertisement information that is associated with the highest bid.

In another general aspect, a computer-readable medium with computer-executable instructions stored thereon performs the method of providing an image, identifying a region of interest in the image, providing a user-selectable link associated with the region of interest in the image, receiving a request for the region of interest in the image via the user-selectable link, and presenting advertisement information associated with a stored image that is associated with the requested region of interest.

Implementations may include one or more of the following features. For example, identifying the region of interest in the image comprises analyzing one or more stored images to locate a stored image that includes features within the region of interest. The one or more stored images comprise images received from a user. Identifying the region of interest in the image comprises analyzing a set of global positioning coordinates associated with the region of interest.

In another general aspect, a method comprises presenting an image having discrete regions of interest, providing a user-selectable link associated with one or more of the regions of interest in the image, receiving a request for one of the regions of interest in the image via the user-selectable link, analyzing one or more stored images to locate a stored image that includes features within the requested region of interest, and providing one or more of a link to a content site or an advertisement associated with the located stored image.

Implementations may include one or more of the following features. For example, the method further comprises receiving a bid for the region of interest in the image, wherein the received bid is based on the bid associated with the located stored image. The one or more stored images comprises images received from a user.

In another general aspect, a computer-readable medium with computer-executable instructions stored thereon performs the method of presenting an image having discrete regions of interest, providing a user-selectable link associated with one or more of the regions of interest in the image, receiving a request for one of the regions of interest in the image via the user-selectable link, analyzing one or more stored images to locate a stored image that includes one or more of the features within the requested region of interest, and providing one or more of a links to a content site or an advertisement associated with the located stored image.

Implementations may include one or more of the following features. For example, the computer-readable medium performs the additional step of receiving a bid for the region of interest in the image, wherein the received bid is based on the bid associated with the located stored image.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
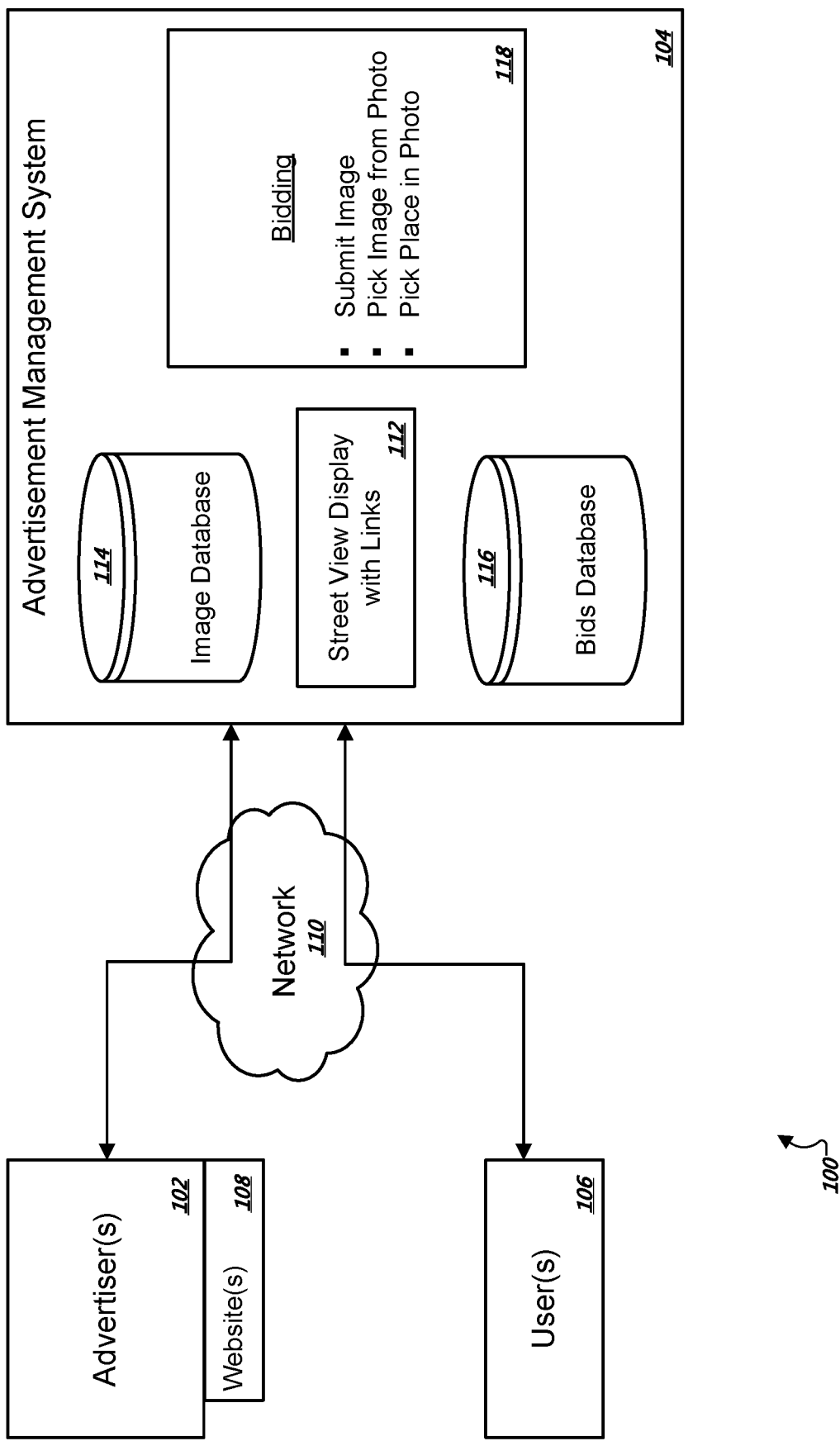
FIG. 1 illustrates an example of an environment for implementing an image based ad targeting system.

FIG. 1 illustrates an example of an environment 100 for implementing an image based ad targeting system. One or more advertisers 102 can directly or indirectly enter, maintain, and track advertisement ("ad") information in an advertising management system (AMS) 104. The ads may be in the form of graphical ads, such as banner ads, text only ads, image ads, audio ads, video ads, ads combining one or more of any such components, etc. The ads may also include embedded information, such as a links, meta-information, and/or machine executable instructions. One or more users 106 may submit requests for ads to the AMS 104. The AMS 104 responds by sending ads to the requesting user 106. Users can include publishers which publish content (e.g., Internet website content). A computer network 110, such as a local area network (LAN), wide area network (WAN), the Internet, or a combination thereof, connects the advertisers 102, the AMS 104, and the users 106.

The AMS 104 includes a street view display server 112 which can provide a user 106 with an image of a geographic location embedded and/or hot linked with advertisement information. The images available through the street view display server 112 can be used to provide the user with mapping and/or driving directions information. For example, through interfacing with a Global Positioning System (GPS) navigational device, the user 106 can receive photographic images from the street view display server 112, providing the user 106 with a photographic image of the present location or a desired destination. The images are stored within an image database 114.

The advertisers 102 can upload images to the image database 114 within the AMS 104. The image database 114 contains images which can be recognized as groups of features within a photographic image such as an image of a city block. For example, a car has a set of features including features composing the grill, tires, headlamps, hood, bumpers, windshield, mirrors, doors, windows, trunk, etc. Groups of features, also described as a region of interest (ROI), can be selected from within a geographic photo display (e.g., by hand, through digital photographic recognition means, etc.) and added to the image database 114. For example, corporate logos, brick and mortar store signs, and product images associated with the advertisers 102 can be stored within the image database 114.

The AMS 104 can also provide the advertisers 102 with the capability of bidding on images within the image database 114. For example, the advertiser 102 can upload one or more images representing a corporate logo through a bidding server 118, and the advertiser 102 can bid upon the image(s). The bidding server 118 can locate images similar to the images uploaded by the advertiser 102. The bidding server 118 can suggest that the advertiser 102 bid on the similar images as well. In the event that an image that the advertiser 102 bid on is recognized within a region of interest in a geographic photo display requested by the user 106, the street view display server 112 can incorporate advertisement information from the advertiser 102 within the region of interest in the geographic photo display.

In addition to bidding on images within the image database 114, the bidding server 118 can allow the advertisers 102 to place bids upon regions of interest within the geographic photo displays. For example, the advertisers 102 can upload addresses or GPS coordinates of brick and mortar stores and bid upon the region of interest within the geographic photo displays which include the address of the store. In another example, advertisers 102 can bid for a region of interest within a geographic photo display portraying a popular landmark (e.g., the Golden Gate Bridge). In some implementations, more than one advertiser 102 can place a bid upon the same image, geographic photo display, and/or region of interest within a geographic photo display.

In some implementations, the users 106 can request geographic views (e.g., city block, historical landmark, image of a strip mall, current traffic conditions on a segment of highway, etc.) from the AMS 104. For example, the user 106 can request a street view in relation to visual driving directions. The street view display server 112 combines the requested content with one or more of the ads provided by the advertisers 102. The ads can be stored within the AMS 104, received by the advertisers 102 at the time of the request, or accessed from another location accessible by the AMS 104 (e.g., via the network 110).

The street view display server 112 compares photographic regions of interest with images stored within the image database 114. If the images match, the street view display server 112 can locate a bid for that image within the bids database 116 and link that region of interest to an advertisement. Linking an advertisement to a region of interest within a geographic view includes creating a selectable region within the geographic view. In other implementations, advertisements (e.g., banner ads, textual ads) can be embedded within and/or alongside the geographic view. The embedded ads can also be user selectable. The combined image content and advertisement content (e.g., inline advertisements, hot-linked image regions, etc.) can be sent to the user 106 for presentation in a viewer (e.g., a web browser, a mobile device, a vehicle navigation device, or other content display system).

In some implementations, selecting a hot-linked region or embedded ad can provide the user with navigation to the advertiser's website 108. One or more advertisers 102 can be associated with one or more websites 108. For example, an advertiser can promote an Internet-based business, a brick and mortar business, or a business which has both an Internet presence and brick and mortar establishments.

As can be appreciated from the foregoing, the AMS 104 can serve users 106, such as individual electronic devices, web publishers, content servers and search services. The AMS 104 permits serving of ads targeted to regions of interest located within geographic displays. For example, a network or inter-network may include an advertising management system serving geographic photos with in-line targeted ads in response to requests from a map and/or driving directions service. In some implementations, the user 106 provides the AMS 104 with an addressing means (e.g., street address, GPS coordinates, etc.) for photo selection. In response, the AMS 104 coordinates a street view display of the address received with inline advertising and/or embedded advertising links targeted to regions of interest recognized within the street view display. The street view display server 112 contains geographic display images which have already been reviewed, either electronically or by hand, and matched with groups of local features, the group being located within a region of interest. The features within a region of interest, for example, can match one or more features within an image contained within the image database 114. Advertisements are coordinated with the recognized feature groups and compiled within the street view display which is returned to the user 106.

Figure 2:
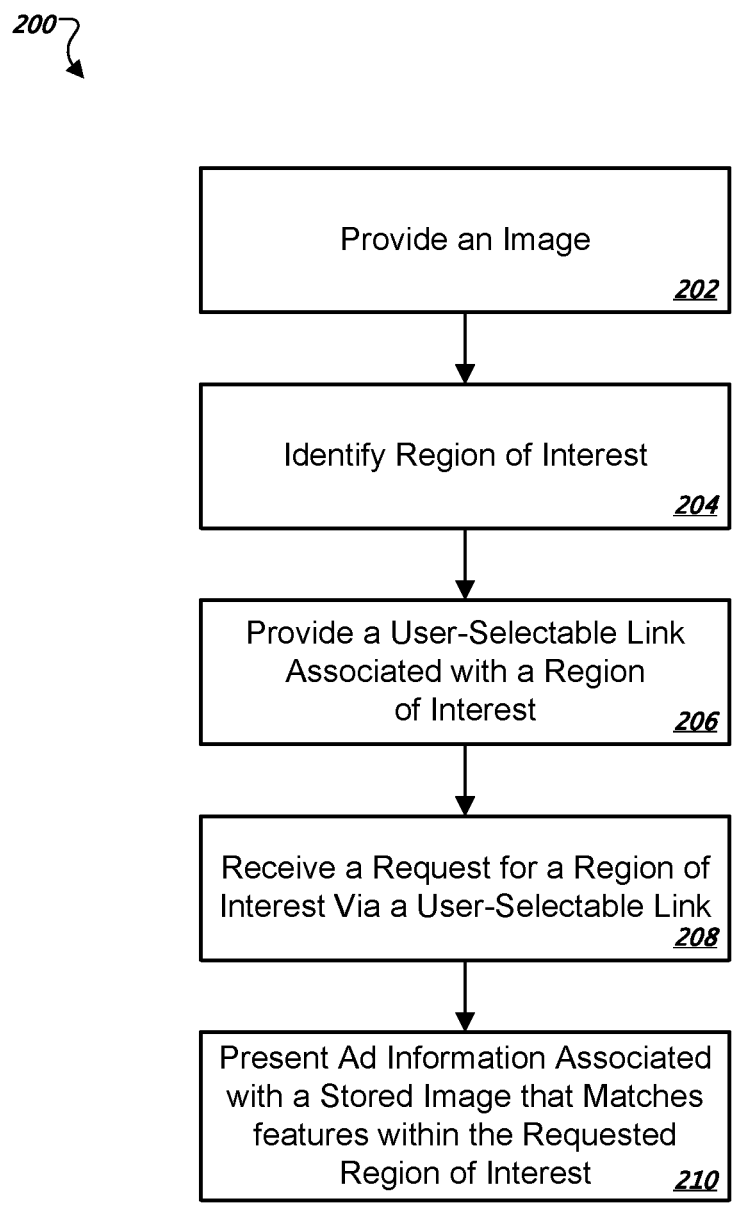
FIG. 2 is a flow diagram of an example image based ad targeting process.

FIG. 2 is a flow diagram of an example image based ad targeting process 200. The steps of process 200 do not have to occur in a specific order and at least some steps can occur in parallel. The ad targeting process 200 begins with providing a geographic display image (202). The image can be provided, for example, to the street view display server 122 (as shown in FIG. 1). The image is retrieved from the image database 114 in response to a request from a user 106 for a particular geographic location. For example, a user 106 connected to the AMS 104 via the network 110 can request a geographic display corresponding to a particular region (e.g., GPS coordinates, street address, etc.). The street view display server 112, for example, can retrieve the geographic display image associated with the requested region from the image database 114.

The image file is analyzed to identify local features (204). Local features are portions or sections of the image file that are visually distinguishable. The detection of local features consists of two steps: interest point detection and feature generation. Interest point detection addresses the problem of finding visually salient, yet stable, points on images (e.g., the edge and corner of an object, etc.). Common algorithms include the Difference of Gaussian (DoG) approach, or the Laplacian of Gaussian (LoG) approach, which are described in C. Schmid, R. Mohrand and C. Bauckhage, Evaluation of Interest Point Detectors, Int'l Journal of Computer Vision, 37(2), 151-172, 2000 (http://perception.inrialpes.fr/Publications/2000/SMB00), which is incorporated herein by reference in its entirety. Once an interest point is detected, the second step, generally, is to generate features around the interest point. An exemplary approach to generating features around the interest point includes an orientation histogram. Upon identification of one or more of the local features, the group of local features, also referred to as the region of interest, can be compared with stored images (e.g., within the image database 114). For example, a coffee shop logo can be identified from the coffee shop sign. The image database 114 may contain images that advertisers have selected, or bid on, to associate with one or more ads. In other implementations, an advertiser could have bid upon a region of interest within the image file.

A user-selectable link is provided in relation to the region of interest (206). The link can be associated with an advertiser, for example the advertiser which placed the highest bid on the image recognized within the region of interest. Any portion of the geographic display image in which the region of interest is located can be selectable (e.g., hot-linked). For example, the coffee shop sign and/or the coffee shop logo within the sign can be hot-linked to an advertisement for the coffee shop. In other examples, the coffee shop logo can be hot-linked to menu information, customer reviews, store hours, and/or other pertinent information.

In other implementations, an empty region within the image can be provided for populating with links associated with the image and/or regions of interest contained within the image. For example, a hot-linked text ad, banner ad, or other indicator can be provided to allow a user to navigate to further information. The hot-links can be associated, for example, with regions of interest within the image (e.g., coffee shop logo, etc.) or with information pertinent to the general location portrayed within the geographic display image (e.g., ad for local sports team, etc.).

In some implementations, user-selectable links are visually indicated. For example, a user-selectable region can be outlined, highlighted, or rendered in a brighter or shaded manner as compared to the remainder of the image. A user-selectable text link can be underlined, in bold, etc.

A request is received via a user-selectable link for information regarding a region of interest (step 208). For example, a user touches, clicks on, or otherwise provides input to the device on which the hot-link is displayed to receive further information in regard to the region of interest. For example, the user could select the coffee shop logo within a geographic view of a street. Selection of the hot-link navigates the user to content provided by the AMS 104. The AMS 104 coordinates the presentation of information associated with user-selectable links. In other implementations, the link navigates the user to the advertiser 102 (e.g., an advertiser's website 108).

Information associated with the selected region of interest is presented to the user (step 210). The information replaces the display of a portion of the image. For example, the information can be presented within an upper region of the image, presented in place of the entire image, etc. Alternatively, the information can be presented beneath the image, alongside the image, or in a separate display region from the image (e.g., pop-up window). The information can include an advertisement, hours of operation, menu information, customer reviews or ratings, or other information that is pertinent to the region of interest and/or the general location portrayed within the geographic display image. For example, an advertisement for the coffee shop associated with the coffee shop logo can be presented to the user upon selection of the coffee shop logo feature within the image.

The information can be associated with the stored image which matches one or more features within the region of interest (e.g., an image stored within the image database 114). For example, the advertiser 102 could bid upon an image in the image database 114, and the bid within the bid database 116 can be associated with ad content. When a group of features within a region of interest is found to match one or more features within the image in the image database 114, the ad content associated with the bid for that image can be attached to the region of interest by a user-selectable link. The ad content can be stored within the AMS 104, a data repository accessible by the AMS 104 (e.g., via network 110), or the advertiser 102, for example.

In some implementations, key words can also be associated with a region of interest. For example, a region of interest containing an image of the Eiffel Tower can be associated with the key words Paris, Eiffel Tower, Champ de Mars, etc. In this example, an advertiser could bid upon a key word such as "Eiffel Tower". Ad content associated with the key word bid, for example, could be linked to the region of interest containing the image of the Eiffel Tower.

Different types of information can be provided within the same selectable link. For example, a mouse-over, right click, etc. of a region can provide a first grouping of information. The first grouping of information can contain options for obtaining additional information. For example, a drop-down menu could be displayed, offering a product listing, customer reviews, and/or a discount offer for the coffee shop associated with the user-selectable logo. Selection of one of the options from the first grouping of information can provide the user with a second display of information associated with the feature (e.g., menu, coupon code, hours, etc.). Other levels of presentation are possible. Moreover, geolocation can be manual by the advertiser, or it can be automatic based on the selection of relevant regions of interest by the advertiser, or it can be automatic based on non-image information provided by the advertiser.

Figure 3:
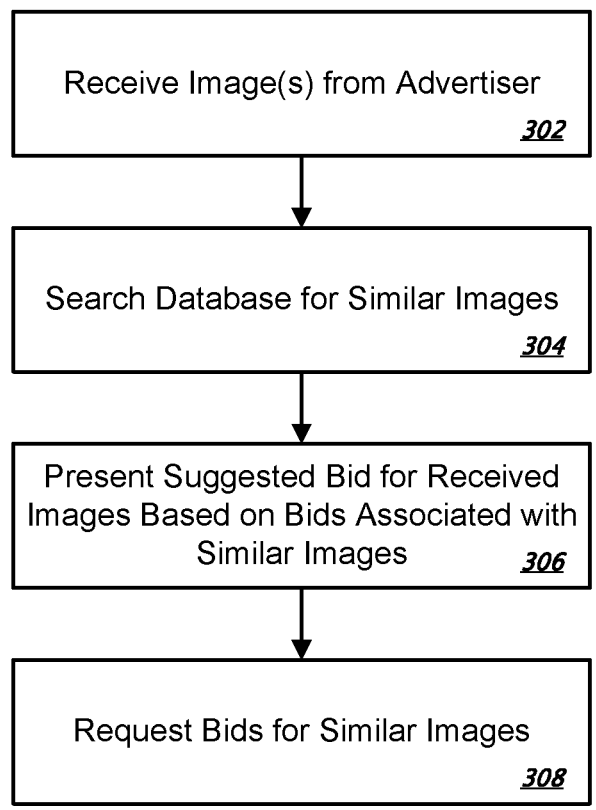
FIG. 3 is a flow diagram of an example process for bidding in an image based ad targeting system.

FIG. 3 is a flow diagram of an example process flow 300 for bidding in an image based ad targeting system. As described with respect to FIG. 2, advertisers can bid on a particular image in an image database to associate the image with desired ad content. However, it may be difficult for an advertiser to determine an appropriate bid amount for a particular image. To help establish an appropriate bid, the particular image that an advertiser is interested in may be compared against the database of images to locate similar images. Bids associated with these images may then be presented to the advertiser as suggested bids.

An advertiser provides one or more images to bid on (302). The advertiser may wish to have a desired ad be presented when a particular group of features is presented within an image (e.g., an image of a geographic location such as a city block). Accordingly, the advertiser either selects or provides a desired image or images.

In some implementations, the advertiser selects one or more images from an online database (e.g., browser interface to the contents of the image database 114). For example, an advertiser may wish to have an advertisement for a car dealership appear when a particular make or model of vehicle is displayed within an image. The advertiser may browse a database to locate available images of vehicles. In another example, the advertiser may search a database using key words associated with available images. When the advertiser has found a suitable vehicle image or images the advertiser may select them for bidding.

In other implementations, the advertiser already has a desired image or images and wishes to bid on those images or related images. For example, the advertiser may wish to have a selected ad display when an image of a corresponding logo is displayed. Accordingly, the advertiser may submit one or more images of the desired logo.

Further, the advertiser may optionally annotate the image to highlight desired local features. Because an image may contain several local features that may not be germane to the advertiser's business, the advertiser may wish to specify the particular features that the advertiser wishes to associate with a desired ad. Continuing the example given above, the advertiser may have one or more images of the desired logo. Many of the images may feature the logo on cars, or t-shirts, or may also include objects that the advertiser is not interested in associating the ad with. Accordingly, the advertiser may annotate the image to point out or highlight the desired local features of the image. In some implementations, advertisers may circle or highlight the desired features on the image using a selection tool included in a user interface, for example.

An image database is searched for images similar to the provided image (304). The database may be searched for images using image and object recognition techniques, such as, for example, by finding images that contain local descriptors that are similar (e.g., under L2 distance) to the provided image.

A representative image is analyzed to determine local features. The located local features can then be used to search for similar features within other images, rather than the entire image. Where the user has annotated the image or images to illustrate desired local features, the identified local features can be used to search the database. In some implementations, the advertiser can use key words instead of or in addition to using an image-based search. For example, the advertiser could search for "car", "vehicle", make and/or model names, etc. in locating additional images of cars.

The advertiser is presented with one or more suggested bids for the images (306). The bids can be based in part upon bids associated with similar images if any have been located. Because an advertiser may not know how to determine an appropriate bid for a particular image, it may be helpful to show the advertiser current maximum bids on the identified related images as a reference. The advertiser may bid on the desired image and provide a desired content to associate with the image. In some implementations, the advertiser may additionally specify a method of presenting the content associated with the image. For example, the advertiser may specify that the information be presented by creating a hot-link in the region of interest associated with the selected image or presenting a banner ad within the viewer presentation.

In addition, the advertiser may optionally bid on one or more of the related images (308). For example, in addition to presenting the advertiser with suggested bids based upon similar images, the advertiser can be presented with the option of bidding on one or more similar images. The current highest bid associated with each image may be provided to the advertiser to aid in bidding. For example, each similar image can be provided to the advertiser within a display along with a dollar amount bid associated with each image. The advertiser can then place a bid for each desired image from the image database. The advertiser may search for images similar to one or more of the database images displayed.

Figure 4:
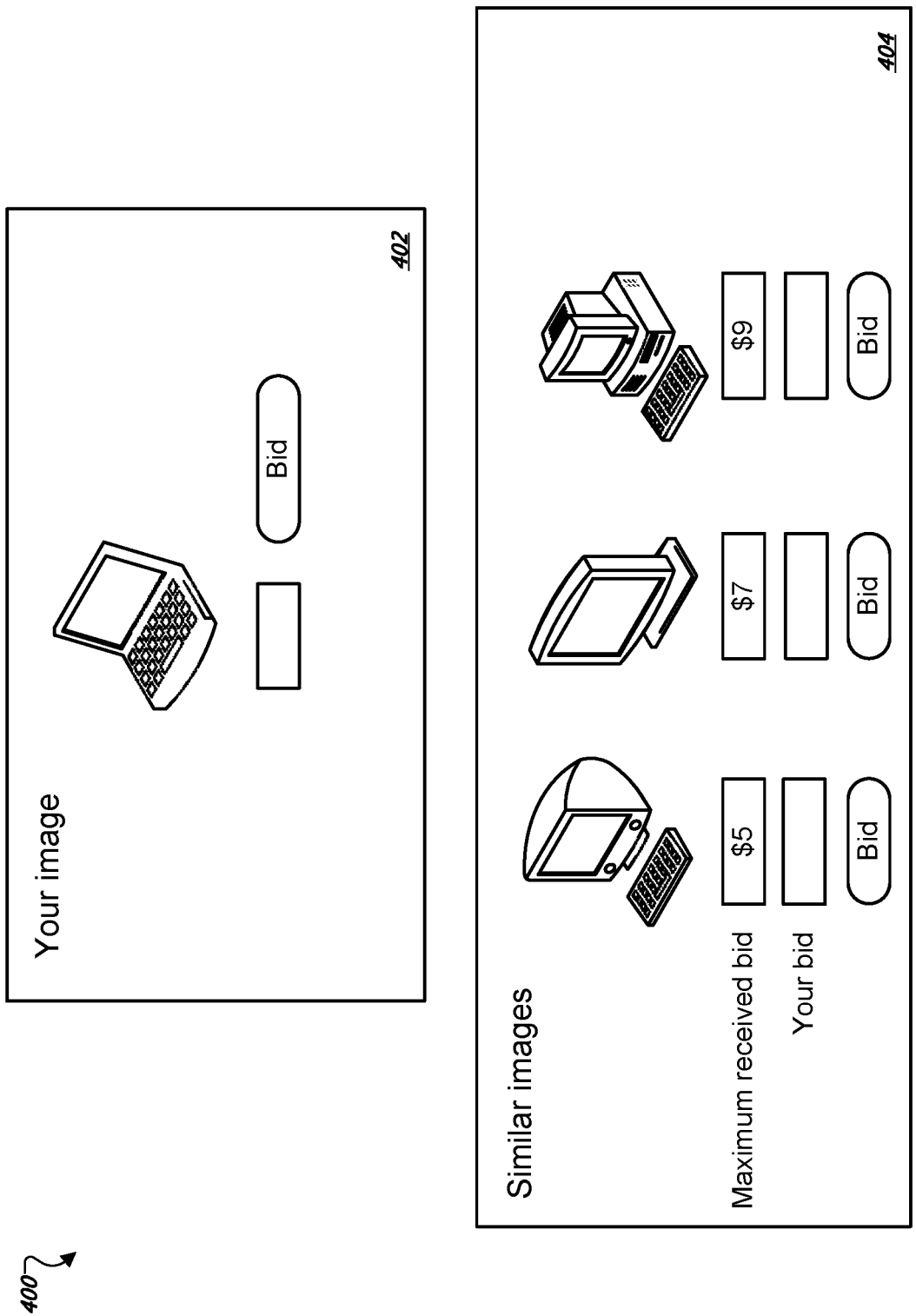
FIG. 4 is a screen shot of an example user interface for bidding in an image based ad targeting system.

FIG. 4 is a screen shot of an example user interface 400 for bidding in an image based ad targeting system. Using the user interface 400, an advertiser may bid to have an ad or ads associated with a selected image. The associated ad may then be presented when the selected image appears as a group of features within a region of interest in an image provided to a user (e.g., geographic display image).

As shown in window 402, the advertiser has selected an image of a computer to bid on. In some implementations, the advertiser presents or uploads an image. Alternatively, the advertiser may have selected the image from a database of images by browsing the database of images or searching the database of images using one or more key words such as, for example, "computer", "notebook", and/or "laptop".

Based on the selected image, one or more similar images are identified and presented to the advertiser in window 404. In order to help the advertiser determine an appropriate bid for the selected image, one or more similar images that have received bids are displayed along with their current maximum bid. As shown in window 404, three images of computers have been displayed. The images have received maximum bids of five, seven, and nine dollars.

Using the displayed maximum bids as guidance, the advertiser may determine an appropriate bid for the selected image. The advertiser may enter the bid in the text box displayed in window 402 and submit the entered bid by pressing the button labeled "Bid", for example.

Further, the advertiser may make additional bids on one or more of the displayed images. After viewing one or more of the similar images displayed in window 404, the advertiser may like to place bids on the displayed similar images instead of, or in addition to, the selected image. Accordingly, the advertiser may enter the bids in the text boxes underneath each of the similar images in window 404.

Figure 5:
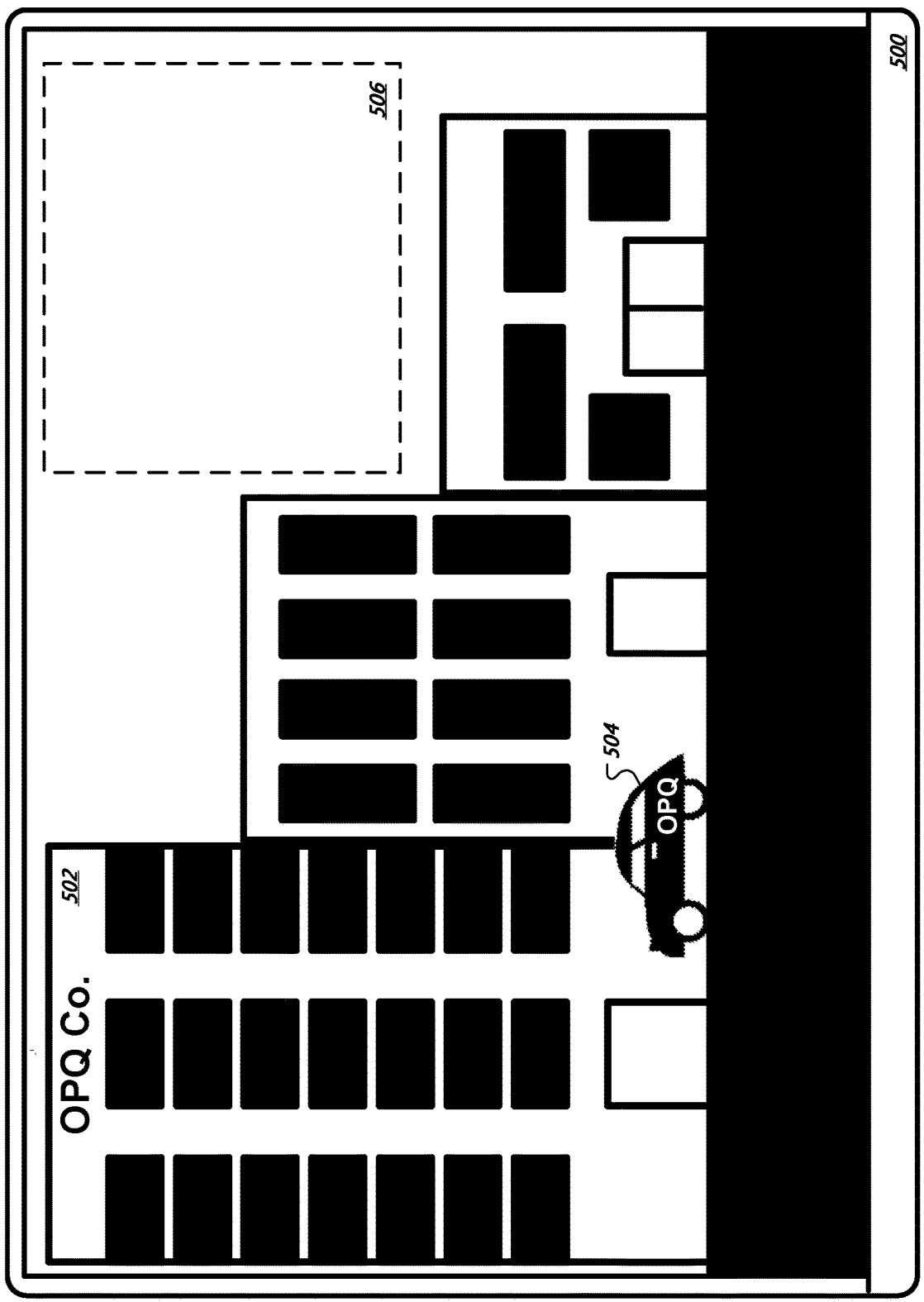
FIG. 5 is a screen shot of a system for providing ads associated with images in a photo map environment.

FIG. 5 is a screen shot 500 of a system for providing ads associated with images in a photo map environment. The system, for example, can provide image-based driving directions within an Internet web-based tool or a vehicle navigation tool. The screen shot 500 portrays three buildings and a car. The leftmost building 502 includes a logo of the OPQ Company. A car 504 is marked with the OPQ logo as well. The building 502 and/or the car 504 can contain hot-links, providing a user with access to information regarding the OPQ Company when either the building 502 or the car 504 is selected. Additionally, a hot link to information regarding the OPQ Company (e.g., banner ad, text, etc.) can be presented within a presentation area 506.

An advertiser associated with the OPQ Company bids upon one or more versions of the OPQ logo. An advertiser can provide more than one version of a logo to aid in feature matching. Different versions of a single item such as a logo can aid in feature matching between images stored within an advertising management system and features found within a region of interest in a geographic display (e.g., the street view display presented within screen shot 500). For example, the same logo may appear differently to feature matching software when displayed as a neon building sign versus a screen print on a vehicle exterior. Relative size (e.g., bold vs. narrow type), color, texture, illumination, angle of view, material (e.g., wood, metal, fabric, etc.), can all have an effect upon the perception of the features. In another example, the OPQ Company may have multiple versions or styles of logo. In this case, each version can be uploaded to the AMS to aid in feature matching. The advertiser can place one bid regardless of the logo image, or alternatively, the advertiser can vary bids depending upon the version of the logo image. For example, the advertiser could bid a greater amount for the neon store sign version of a logo versus a wooden park bench version of the same logo.

Selection of the building 502 and/or the car 504 results in ad information displayed within the presentation area 506. For example, selection of the car 504 can result in an advertisement for OPQ Company being displayed within the presentation area 506. The advertisement information provided within the presentation are 506 can be interactive.

The advertisement information provided via the hot-link can depend upon the region of interest selected. For example, selecting a hot-link associated with a region of interest matching the neon store sign version of the OPQ Company logo may provide the user with information regarding the OPQ Company in general, while selecting a hot-link associated with the region of interest matching the vehicle logo may provide the user with information regarding a vehicle model manufactured by the OPQ Company, a courier division of the OPQ Company, etc.

In some implementations, more than one hot-link can be provided to more than one advertiser within a single image. For example, the OPQ Company vehicle could be parked outside of the RST Company building. Ads for both the OPQ Company and the RST Company, for example, can be hot-linked into the screen shot 500.

Figure 6:
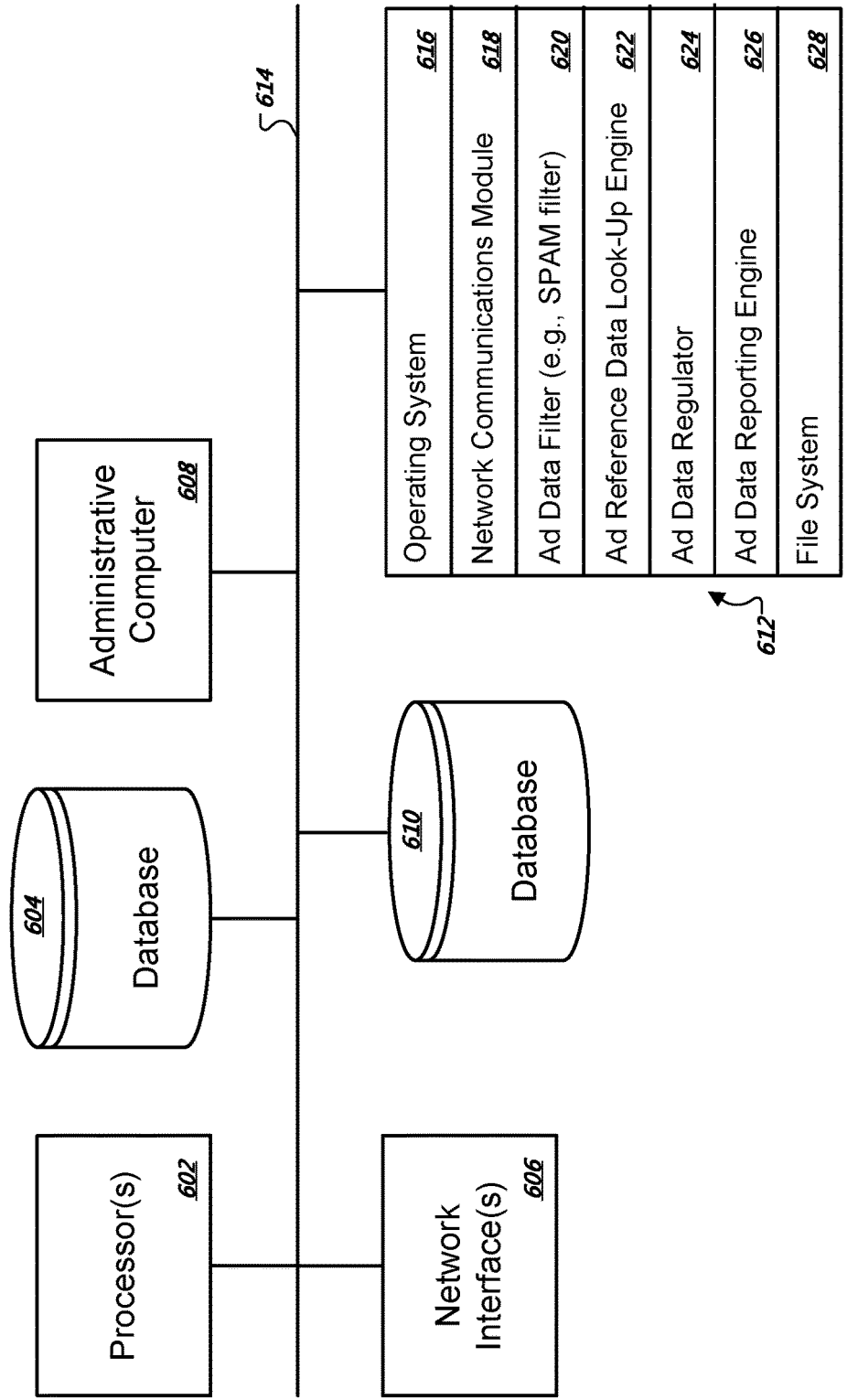
FIG. 6 is a block diagram illustrating an example system architecture for an online advertising data aggregation and data delivery system.

FIG. 6 is a block diagram illustrating an example system architecture for an online advertising data aggregation and statistical data delivery system, such as a reporting system. The system architecture 600 includes one or more processors 602, one or more network or communication interfaces 604, databases 604 and 610, an administrative computer 608, memory 612, and a data bus 614 interconnecting these components.

The administrative computer 608 may include input devices, such as a keyboard and mouse, and output devices, such as a display (not shown). From the administrative computer 608, an administrative computer may administer the aggregation and reporting system.

Databases 604 and 610 may store advertisement reference data and aggregated advertising data, respectively. The advertisement reference data includes various information associated with advertisements, such as the type of advertisement, key words to which the advertisements are targeted, and so forth. The aggregated data may be presented to advertisers in reports generated by the system.

Memory or computer readable medium 612 may store an operating system 616 for performing system functions, a network communication module 618 for communicating with other computers or devices through one or more networks, an ad data filter 620 (e.g., spam filter) for filtering advertising data, an ad reference data look-up engine 622 for retrieving advertisement reference data from database 604, an ad data aggregator 624 for aggregating advertising data and applying cut-off criteria to the advertising data, an ad data reporting engine 626 for receiving requests for advertising data reports, generating such reports, and sending such reports to the requestors, or presenting the statistical data to the user via the user interface so that the user may modify its advertising placement choices in the manner described above, and a file system 628 for storing filtered advertising data pending further processing.

The disclosed and other implementations and the functional operations described in this description can be implemented in digital electronic circuitry, or in computer software, firmware, or hardware, including the structures disclosed in this specification and their structural equivalents, or in combinations of one or more of them. The disclosed and other implementations can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this description can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the disclosed techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed techniques can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of what is disclosed here, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this description contains many specifics, these should not be construed as limitations on the scope of what being claims or of what may be claimed, but rather as descriptions of features specific to particular implementations. Certain features that are described in this description in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understand as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims.

What is claimed is:

1. A computer-implemented method, comprising:
    determining, by a mobile device, a current location associated with a user of the mobile device;
    obtaining, by the mobile device, a first image that corresponds to the current location associated with the user of the mobile device;
    providing, by the mobile device, the first image for display to the user;
    identifying, by the mobile device, a plurality of regions in the first image, each region in the plurality of regions depicting a respective object that is determined to match at least one of a plurality of pre-defined objects that are each associated with a respective target entity, wherein at least one of the plurality of regions is identified using an automated image analysis by generating a group of local features in the first image, the group of local features generated by identifying an object edge or corner and detecting related features around the object edge or corner;

generating, by the mobile device, a plurality of interactive links, each interactive link located at a different one of the plurality of regions in the first image so as to permit the user to interact with one of the plurality of interactive links in each of the plurality of regions;

receiving, by the mobile device, an indication of a user interaction with a first interactive link of the plurality of interactive links in a first region of the plurality of regions of the first image; and in response to receiving the indication of the user interaction with the first interactive link in the first region of the first image, causing an application on the mobile device to access a resource of the respective target entity associated with the object depicted in the first region.

2. The method of claim 1, wherein the respective object depicted in the first region of the first image is a car or a building.

3. The method of claim 1, wherein the first image comprises a street-view image.

4. The method of claim 1, wherein the respective object depicted in the first region of the first image is a logo of the respective target entity associated with the respective object.

5. The method of claim 1, wherein different types of interactive links are overlaid on different instances of a same logo in the first image.

6. The method of claim 1, wherein the first interactive link over the first region of the first image links to a first resource of the respective target entity and a second interactive link over a second region of the first image links to a second resource of the respective target entity.

7. The method of claim 1, wherein the resource of the respective target entity is selected as the target of the first interactive link based on a determination that the resource corresponds to a characteristic of the object depicted in the first region.

8. A non-transitory computer-readable storage device storing instructions, that when executed by one or more processors, cause performance of operations that comprise:
  determining, by a mobile device, a current location associated with a user of the mobile device;
  obtaining, by the mobile device, a first image that corresponds to the current location associated with the user of the mobile device;
  providing, by the mobile device, the first image for display to the user;
  identifying, by the mobile device, a plurality of regions in the first image, each region in the plurality of regions depicting a respective object that is determined to match at least one of a plurality of pre-defined objects that are each associated with a respective target entity, wherein at least one of the plurality of regions is identified using an automated image analysis by generating a group of the local features in the first image, the group of local features generated by identifying an objet edge or corner and detecting related features around the object edge or corner;
  generating, by the mobile device, a plurality of interactive links, each interactive link located at a different one of the plurality of regions in the first image so as to permit the user to interact with one of the plurality of interactive links in each of the plurality of regions;
  receiving, by the mobile device, an indication of a user interaction with a first interactive link of the plurality of interactive links in a first region of the plurality of regions of the first image; and
  in response to receiving the indication of the user interaction with the first interactive link in the first region of the first image, causing an application on the mobile device to access a resource of the respective target entity associated with the object depicted in the first region.

9. The device of claim 8, wherein the respective object depicted in the first region of the first image is a car or a building.

10. The device of claim 8, wherein the first image comprises a street-view image.

11. The device of claim 8, wherein the respective object depicted in the first region of the first image is a logo of the respective target entity associated with the respective object.

12. The device of claim 8, wherein different types of interactive links are overlaid on different instances of a same logo in the first image.

13. The device of claim 8, wherein the first interactive link over the first region of the first image links to a first resource of the respective target entity and a second interactive link over a second region of the first image links to a second resource of the respective target entity.

14. A system comprising:
  one or more processing devices; and
  one or more storage devices storing instructions that are executable by the one or more processing devices to perform operations comprising:
    determining, by a mobile device, a current location associated with a user of the mobile device;
    obtaining, by the mobile device, a first image that corresponds to the current location associated with the user of the mobile device;
    providing, by the mobile device, the first image for display to the user;
    identifying, by the mobile device, a plurality of regions in the first image, each region in the plurality of regions depicting a respective object that is determined to match at least one of a plurality of pre-defined objects that are each associated with a respective target entity, wherein at least one of the plurality of regions is identified using an automated image analysis by generating a group of local features in the first image, the group of local features generated by iddentifying an object edge or corner and detecting related features around the object edge or corner;
    generating, by the mobile device, a plurality of interactive links, each interactive link located at a different one of the plurality of regions in the first image so as to permit the user to interact with one of the plurality of interactive links in each of the plurality of regions;
    receiving, by the mobile device, an indication of a user interaction with a first interactive link of the plurality of interactive links in a first region of the plurality of regions of the first image; and
    in response to receiving the indication of the user interaction with the first interactive link in the first region of the first image, causing an application on the mobile device to access a resource of the respective target entity associated with the object depicted in the first region.

15. The system of claim 14, wherein the respective object depicted in the first region of the first image is a car or a building.

16. The system of claim 14, wherein the first image comprises a street-view image.

17. The system of claim 14, wherein the respective object depicted in the first region of the first image is a logo of the respective target entity associated with the respective object.

18. The system of claim 14, wherein different types of interactive links are overlaid on different instances of a same logo in the first image.

* * * * *